March 21, 1967 L. E. JENNINGS 3,310,083
NUTCRACKER
Filed July 29, 1964
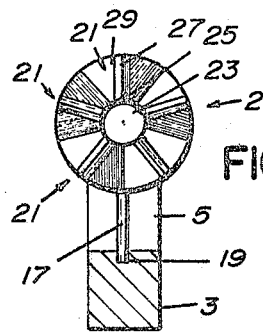
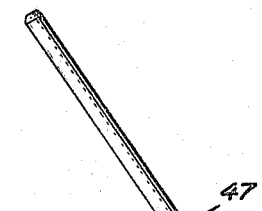
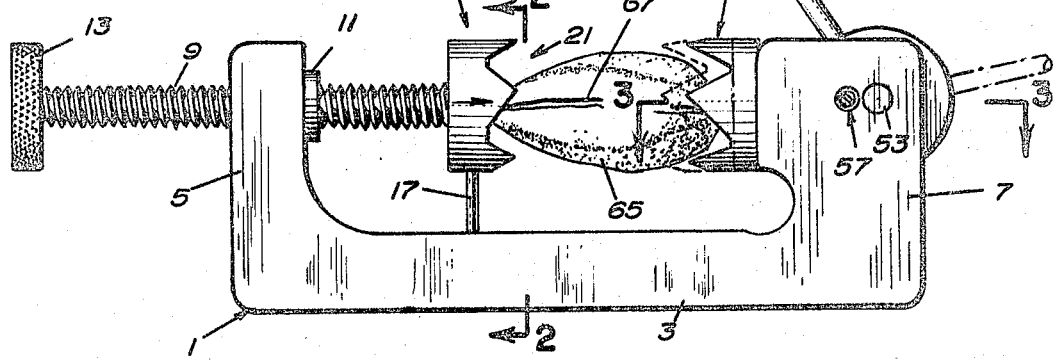
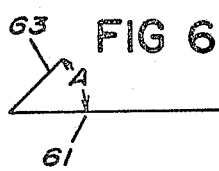
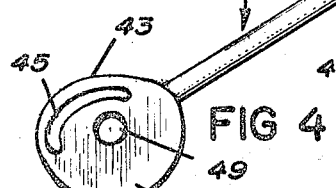
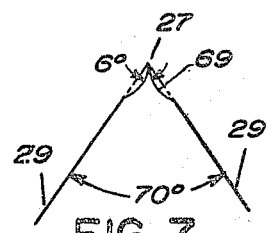
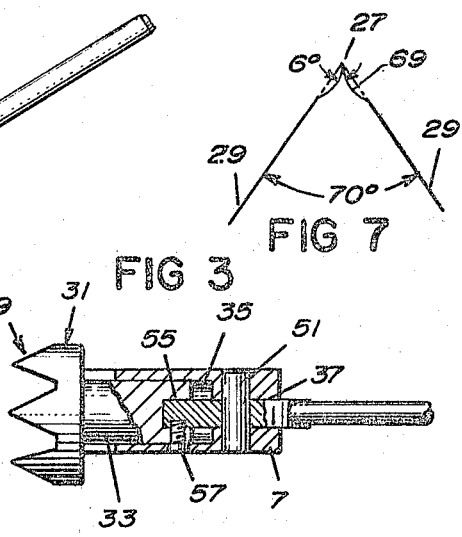
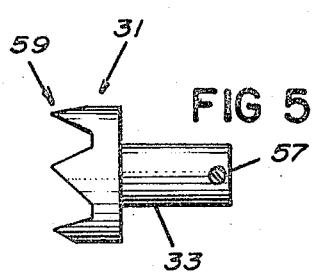
INVENTOR
Lloyd E. Jennings
BY Peck & Peck
ATTORNEYS United States Patent Office 3,310,083
Patented Mar. 21, 1967

3,310,083
NUTCRACKER
Lloyd E. Jennings, 525 Timber Lane,
Falls Church, Va. 22046
Filed July 29, 1964, Ser. No. 386,018
1 Claim. (Cl. 146—16)

This invention relates broadly to the art of nutcrackers and in its more specific aspect it relates to such nutcracker which causes a unique shattering or breakage of the shell without damaging the meat therein; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

I am aware that many nutcrackers have heretofore been devised with the purpose of facilitating the removal of the nut meat from the shell in which it is enclosed, however it has been my experience with prior nutcrackers that in most instances not only is the shell of the nut cracked or shattered but the meat is also damaged so that the user of the nutcracker is unable to obtain the meat in whole unbroken sections.

It has been one of my prime objects to provide a nutcracker which so breaks and shatters the shell of the nut so that it is easy to remove the nut meat and so that in the shell-breaking operation the whole bodies of meat are not broken or otherwise damaged. The significance and desirability of such a nutcracker will be readily understood for in most uses of nut meats it is highly desirable to provide the meat in whole body sections rather than in small broken pieces.

I have so designed my nutcracker that it will operate on a variety of types of nuts and in the cracking operation the nut-engaging and cracking means produces certain types of pressures on the shell to, in most instances, produce a cracking of the shell along generally longitudinal lines with respect to the nut and along the seams on the nut shell. In this manner I do not mutilate the shell but instead I crack or shatter along such lines so that it may easily be peeled or otherwise removed from the enclosed undamaged nut meats.

In accomplishing this particular shell-cracking operation, I have devised what I shall term cracking heads which are spaced apart and receive the nut ends. Such heads have been specifically designed by me with means therein which create pressures upon the ends of the nut when the device is operated so that this peculiar and desired shell-cracking operation results. Such novel means which I have embodied in the cracking heads of my nutcracker generate the aforesaid pressures on the shell of the nut to produce these generally longitudinal crack or break lines. These pressure-generating means are preferably in the form of blades which are angularly disposed with respect to the nut or on a projected line from the centers of the heads so that the blades do not actually bite or penetrate into the nut so as to contact and damage the nut meat, instead they create the aforementioned pressures on the nut while slightly penetrating the shell so as to facilitate the shell-cracking operation. The blades or pressure-generating means which are provided on the nut-holding and pressure-generating cracking heads are preferably but not necessarily in complementary relation to one another, that is a blade in one head is in alignment with a blade in the other head.

Included in my purposes in the development of this invention is to provide a nutcracker which is relatively inexpensive to produce, sure and certain in the operation upon the nut, and which requires no particular skill in the operation thereof; thus to properly crack a nut so that the nut meat may be removed from the shell in full body and undamaged condition.

With the foregoing general objects, features and results in view, as well as certain others which will be apparent from the following explanation, the invention consists in certain novel features in design, construction, mounting and combination of elements as will be more fully and particularly referred to and specified hereinafter.

Referring to the accompanying drawings:

FIG. 1 is a view in side elevation of my nutcracker with a nut in operative position therein.

FIG. 2 is a view taken on the line 2—2 of FIG. 1.

FIG. 3 is a view taken on the line 3—3 of FIG. 1.

FIG. 4 is a detailed view disclosing the cam and lever removed from the device.

FIG. 5 is a side view in elevation of the pressure-generating head removed from the device.

FIG. 6 is a schematic view showing the angle of the shell-engaging blade with respect to the projected axes of the pressure-generating head and the adjusting head.

FIG. 7 is a schematic view showing the included angles at the point of each blade and between the bevels thereof.

In the accompanying drawings I have used the numeral 1 to designate in its entirety the supporting means for the operating parts of my device and this supporting means comprises an elongated base 3 provided with an upstanding adjusting head-supporting bracket 5 at one end thereof, and at the other end thereof I form a further upstanding bracket or supporting means 7 for the pressure-generating head and operating means therefor.

The upstanding adjusting head-supporting bracket 5 adjacent to but removed downwardly from the upper end thereof is provided with an opening therethrough extending in a direction substantially parallel with the base 3, and this opening is preferably though not necessarily provided with a flanged sleeve which threadedly receives therein a fast screw 9 which is of substantial length so as to extend through the opening in the upstanding bracket and therebeyond. The flange 11 of the threaded sleeve bears against bracket 5 to maintain the sleeve in position. On its outer end the screw 9 has affixed thereto a knurled operating knob 13 and on its opposite end I attach an adjusting head which I have designated in its entirety by the numeral 15, the screw 9 being attached to the head in any suitable manner so that it may rotate relative to the head. It will now be recognized that the operating head my be translated into various positions relative to the upstanding brackets 5 and 7 when the screw 9 is rotated by means of knob 13 in the threaded opening in the bracket 5. Fixed to and depending from the adjusting head 15 is an arm 17 which extends into a continuous groove 19 which is formed in the upper surface of the base 3. It will be appreciated that this arm 17 prevents the adjusting head 15 from rotating when it is moved longitudinally between the brackets 5 and 7 and upon rotation of the fast feed screw 9.

The adjusting head 15 is formed with a number of inwardly directed blades which have been designated generally by the numeral 21. In the specific example herein shown I have provided five of such blades 21 which are circumferentially spaced apart about the head as clearly illustrated in FIG. 2 of the drawings. While I have disclosed five of such blades it is to be clearly understood that this is merely by way of example and not by way of limitation, for a greater or lesser number of blades may be used and still fall wihin the spirit and scope of my invention. The inner operative surface of the adjusting head 15 which includes the blades is preferably formed with a central cavity 23, which, as will be explained, is adapted to receive one end of the nut being operated upon. Each blade extends outwardly from the periphery of the cavity as at 25, and each blade comprises a sharpened edge 27 which forms the outer operative edge of bevel sections 29 which extend rearwardly therefrom on each side thereof. The blades extend in a flaring manner outwardly from the periphery of the cavity 23 and at an angle which will be explained hereinafter.

I provide a pressure-generating head which I have designated in its entirety by the numeral 31. This head in operative position is disposed in opposing relationship to the adjustng head 15 and is formed with a rearwardly extending stem or plunger 33. The pressure-generating head-supporting bracket 7 is formed with an opening 35 therein into which the stem 33 of the pressure-generating head 31 is slidably positioned. The opening 35 in the bracket 7 opens into a slot 37 which is open at the rear of the bracket and its upper end is also open.

I provide a pressure-generating head operating means which I have designated generally by the numeral 39, such means being particularly illustrated in FIG. 4 of the drawings. This pressure-generating head operating means comprises a generally circular cam 41 having a peripheral cam surface 43 and a generally arcuate cam track 45 therein. Extending from the periphery of this cam 41 adjacent to the rear end of the cam surface 43 thereof is fixed a lever, handle or operating means 47 which extends radially therefrom.

This lever may be threaded into the cam 41 or may be affixed thereto in any suitable manner. The cam 41 is provided with an aperture 49 therein by which the cam and its lever are mounted in operative position within the slot 37 which is provided in the bracket 7, by means of a pin or pintle 51 which extends through the opening 49 in the cam and is fitted into opposing openings 53 in the two sides of the bracket bordering the slot 37 therein. It will thus be recognized that the cam is rotatively mounted in bracket 7. The rear end of the stem 33 of the pressure-generating head 31 is provided with a slot 55 therein extending inwardly from the rear surface thereof, and this slot receives that portion of the cam 41, including the cam slot 45. I provide a set screw or the like 57 which extends radially through a wall of the stem 33 at the slot 55 in the stem and projects into the cam slot 45 of the cam 41.

It will now be apparent that operating movement of the lever 47 to its rearward position as illustrated in dotted lines in FIG. 1 will cause the peripheral cam surface 43 of the cam 41 to engage the inner surface of the slot 55 in stem 33 to project it and the pressure-operating head 59 forwardly into nut-cracking position. When this projecting nut cracking operation has been completed the lever is moved forwardly into full line position in FIG. 1, the stem 33 and pressure-generating head 59 are retracted due to the positioning of the set screw 57 in the cam slot 45 of the cam 41.

The pressure-generating head 31 is formed with the same number and same type of blades as the blades 21 which have heretofore been described in connection with the adjusting head 15. It is desired that the two heads 15 and 31 be so mounted and positioned in the device that each blade of one head is in alignment with a blade of the other head. It is to be understood that the blades of the pressure-generating head 31 which I will designate generally by the numeral 59 are of the same type and configuration as the blades 21 of the adjusting head 15.

It is important in the proper cracking of the shell of a nut so as not to damage the contained edible nut meat that the blades 21 and 59 be angled in a relatively specific manner. In FIG. 6 of the drawings I have illustrated this desirable angular relationship of the blades and I have shown in this figure of the drawings the projected axial line of each head as the line designated by the numeral 61 and I have used the numeral 63 in this figure to indicate the blades 21 and 59 of the adjusting head 15 and the pressure-generating head 31. It is highly desirable that the included angles A between the projected axis 61 and the blades 63 (FIG. 6) be on the order of 54°, and in any event not substantially less. By so angling the blades relative to the lines of force or pressure which are applied to the nut by the heads and the blades, it is assured that such pressures on the nut will not be too great and will only crack the nut in the desired manner without damaging the nut meat and, because of the length of the stroke or forward throw of head 31 the blades of the two heads will not shear or cut into the shell sufficiently to peel the shell entirely from the nut or to cut into the enclosed nut meat. It is not my desire to provide, in effect, a nut shell peeling or nut shell removing device, instead what I wish to obtain and do obtain by my nutcracker is an operating and structural arrangement whereby the shell of the nut is cracked more or less in longitudinal or axial lines with respect to the nut, there being preferably and generally an axial or longitudinal crack caused by each blade of the adjusting head and the pressure-generating head of the device. In other words, a nut will desirably be cracked along five more or less longitudinal or axial lines, whereupon the nut may be removed from the device and the shell may be easily removed from the enclosed meat without causing damage to the latter.

In FIG. 7 of the drawings I have indicated certain angels with which each blade 21 is formed. The full lines 69 in this figure illustrate the cutting edge 27 of the blade and the included angle therebetween is approximately 6° with 1/16 inch radius which blends onto the approximate 70° angle between the beveled sides 29 of each blade. I have found that with each blade formed generally in this manner the cracking operation on the nut is highly successful.

When the device is to be used in a nut-cracking operation the lever 47 of the pressure-generating head 31 is moved rearwardly into position to project the pressure-generating head 31 into the dotted line position of FIG. 1. A nut is then inserted and held in engagement with the pressure-generating head and the feed screw is rotated to move the adjusting head into position against the nut and is adjusted to tightly hold the nut between the two heads. The nut is then cracked in the manner as described above.

I claim:

A nutcracker comprising a pair of oppositely disposed generally circular heads and each head comprising a body from which blades project, a supporting base and said heads being operatively mounted thereon in spaced opposing relation for movement toward and from each other, one of said heads being an adjusting head, means for moving said adjusting head toward and from the other head, and the other of said heads being a pressure-generating head, manual operating means for projecting said pressure-operating head with a limited movement toward and from said adjusting head, and said blades on each of said heads being circumferentially disposed thereon, the blades of one head facing the blades of the other head and each blade of one head being aligned with a blade on the other head, and all of the blades of each head extending angularly outwardly and forwardly from said bodies to the periphery of each head, and each blade is formed with a cutting edge and the included angle between the sides of each cutting edge is approximately 6° and each blade is provided with a bevel extending downwardly from each side of the cutting edge and the included angle between the bevel is approximately 70°.

References Cited by the Examiner

UNITED STATES PATENTS

| 537,477 | 4/1895 | North | 146—16 |
|---|---|---|---|
| 1,148,893 | 8/1915 | Ekstedt | 146—16 |
| 1,485,570 | 3/1924 | Schroeter | 146—16 |
| 1,492,131 | 4/1924 | Johnston | 146—16 X |
| 2,506,822 | 5/1950 | Williamson | 146—16 |
| 2,731,994 | 1/1956 | Snell | 146—16 |

WILLIAM W. DYER, JR., *Primary Examiner.*

J. M. MEISTER, *Examiner.*